UNITED STATES PATENT OFFICE.

EDWARD ROCHE, OF WASHINGTON, DISTRICT OF COLUMBIA.

OIL.

1,036,339.

Specification of Letters Patent.

Patented Aug. 20, 1912.

No Drawing.

Application filed November 21, 1911. Serial No. 661,527.

*To all whom it may concern:*

Be it known that I, EDWARD ROCHE, a citizen of the United States of America, residing at Washington, District of Columbia, have invented certain new and useful Improvements in Oils, of which the following is a specification.

For the manufacture of gas from coal, coal is placed in fire clay or iron retorts, previously heated to a suitable temperature for gas making, and hermetically sealed, where it is permitted to remain from 4 to 6 hours. The gas from the retorts passes through pipes leading from the mouthpiece, known as ascension pipes, to the hydraulic mains, where some of the tarry matter is deposited. From the hydraulic mains, it travels to the condensers where it is cooled, and where it deposits more tarry matter. From the condensers, the gas passes to the exhauster whose function it is, to remove the gas from the retorts as fast as it is made, and at the same time, to propel it onward with sufficient force to enable it to pass through the materials used for its purification, and from thence to the holder. From the exhauster, the gas passes in to the apparatus for the abstraction of ammonia ($NH_3$), and washing the gas. From the scrubbers, the gas passes in to the purifiers which are filled with lime ($CAO$) and oxid of iron ($Fe_2O_3$) to remove carbonic acid ($CO_2$) and hydrogen sulfid ($H_2S$). From these to the gas holders for future use by means of pipes for distribution purposes to consumers. All of which is well known.

As the gas rests in the pipes and flows to the consumer, an oil and water is deposited which is periodically pumped out and carted away.

The oil heretofore has been considered a waste and the water a nuisance, as it destroys all forms of fish life if permitted to run into streams or rivers without being first purified.

To purify the oil for the purpose of water-gas making and other useful commercial purposes, is the purpose of this invention.

The oil and water when pumped out from the city mains is taken to a common receiver. To facilitate its separation, a common receiver with a cone-shaped bottom, with an outlet at its lowest point, is found to be best for such purposes. The water being at the bottom, is first drawn off, and then the oil is also drawn off and poured into a retort such as is used for distilling purposes. The distillation can take place in the usual way.

After the oil is distilled, to further remove all impurities, and to clarify its color, it is filtered through bone black. This gives as a new product, an oil suitable as a lubricant, a fuel and an illuminant. It is also non-gumming and free from acids, its chemical composition corresponding more or less exactly to the formula of $C_nH_{2n-6}$. A sample of this oil, which when tested at the Bureau of Standards, Department of Commerce and Labor at Washington, D. C., for the setting point, flash point and viscosity, gave a result as follows:—Setting point—below —108° F. (—78° C.), when tested for sixteen hours in a Dewar flask with solid carbon dioxid and gasolene. Flash point—38° F. (3.3° C.) when tested in an Abel-Pensky closed-cup tester. Viscosity—48.5 seconds when tested by an outflow of 200 cc. of oil at 20° C. in an Engler viscosimeter, where water showed a result of 51.6 seconds. This rates it at about equal to that of benzin. It is now especially suited for water gas making and other commercial purposes; just as any heavy hydrocarbon oil can be used in the same way for the same purpose.

What I claim is:

1. An oil having approximately a viscosity of 48.5 seconds, a freezing point below —108° F. (—78° C.), a flashing point of 38° F. (3.3° C.), good lubricating qualities for machinery, good heating qualities when used as a fuel, a clear, somewhat yellowish color, and a chemical composition corresponding more or less exactly to the formula $C_nH_{2n-6}$ and free from acids; said oil being obtained from the precipitation of oily and waste matter, from the manufacture of illuminating gas from coal, collected from the gas mains and pipes.

2. A fuel oil having good heating qualities when used as a fuel, and approximately a viscosity of 48.5 seconds, a freezing point below —108° F. (—78° C.), a flashing point of 38° F. (3.3° C.), good lubricating qualities for machinery, a clear, somewhat yellowish color, and a chemical composition corresponding more or less exactly to the formula $C_nH_{2n-6}$ and free from acids; said oil being obtained from the precipitation of oily and waste matter, from the manufacture of illuminating gas from coal, collected from the gas mains and pipes.

3. A lubricant oil having good lubricating qualities when used in machinery, and approximately a viscosity of 48.5 seconds, a freezing point below $-108°$ F. ($-78°$ C.), a flashing point of 38° F. (3.3° C.), good heating qualities when used as a fuel, a clear, somewhat yellowish color, and a chemical composition corresponding more or less exactly to the formula $C_nH_{2n-6}$ and free from acids; said oil being obtained from the precipitation of oily and waste matter, from the manufacture of illuminating gas from coal, collected from the gas mains and pipes.

4. A non-gumming, acid free oil, having approximately a freezing point below $-108°$ F. ($-78°$ C.), a flashing point of 38° F. (3.3° C.) a viscosity of 48.5 seconds, good lubricating qualities when used in machinery, good heating qualities when used as a fuel, a clear, somewhat yellowish color, and a chemical composition corresponding more or less exactly to the formula $C_nH_{2n-6}$; said oil being obtained from the precipitation of oily and waste matter, from the manufacture of illuminating gas from coal, collected from the gas mains and pipes.

In testimony whereof I affix my signature in presence of two witnesses.

EDWARD ROCHE.

Witnesses:
 EDWARD H. YOUNG,
 BENNETT S. JONES.